W. W. POPE.
CABLE CLAMP.
APPLICATION FILED AUG. 7, 1916.
1,266,312.
Patented May 14, 1918.
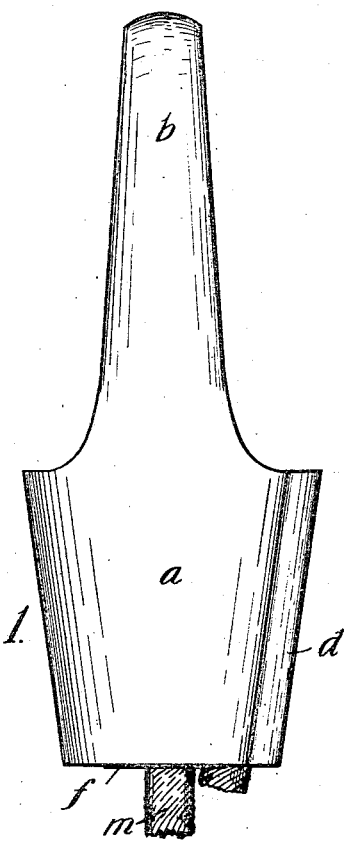
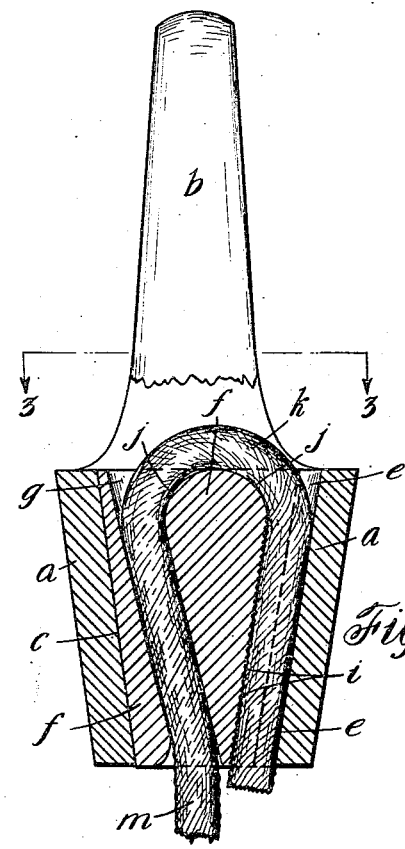
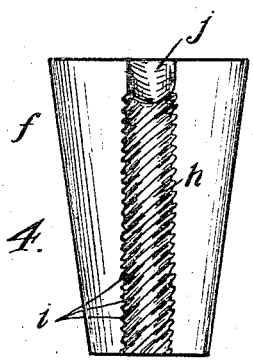
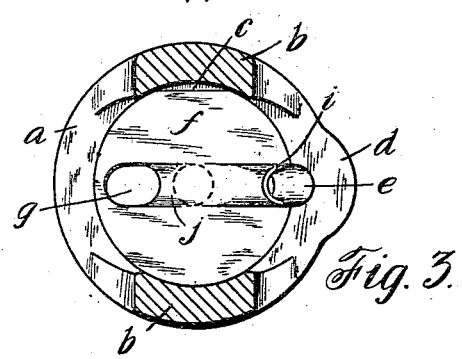
Inventor
William W. Pope
By
*[signature]*
Atty.

UNITED STATES PATENT OFFICE.

WILLIAM W. POPE, OF CAMAS, WASHINGTON.

CABLE-CLAMP.

1,266,312.  Specification of Letters Patent.  Patented May 14, 1918.

Application filed August 7, 1916. Serial No. 113,675.

*To all whom it may concern:*

Be it known that I, WILLIAM W. POPE, a citizen of the United States, and a resident of Camas, county of Clarke, State of Washington, have invented a new and useful Improvement in Cable-Clamps, of which the following is a specification.

This invention relates to devices adapted for clamping an attachment to the end of a cable; such for example as splicing and anchoring cables, for varied work in the logging industry, and for a great many other purposes.

The main object of my invention is to provide a device of this character which will comprise a minimum number of parts, which will be simple and economical in construction, and which will work with an exceptionally high degree of efficiency.

The details of my invention are fully shown in the accompanying drawings which illustrate my device used as an attachment to the end of a wire cable, commonly known as a choker-line. In such drawings:

Figure 1 is a side elevation of the device;

Fig. 2 is a vertical section of same;

Fig. 3 is a horizontal section on the line 3—3 of Fig. 2, with the choker-line removed; and Fig. 4 is an elevation of the frusto-conical wedge which is an important element of my invention.

*a* represents a choker socket member provided with an eye *b*. The socket is made with a smooth tapered bore *c*, in which is included a flattened portion *c′*. One side of the socket is reinforced, as indicated by *d*, and a longitudinal semi-circular or half groove *e* is provided in this reinforced portion, as shown more clearly in Fig. 3. This groove has a diameter approximately equal to that of the cable *m* to be clamped. A wedge plug *f* is frusto-conical in shape, being flattened on one side, and is adapted to seat snugly in the bore *c* of the socket. The related sides of the socket and wedge are made with conforming, flattened faces so as to bring the half grooves of the socket and wedge into registration. Said wedge plug *f* is made with a smooth bore *g*, the lower end of which is co-axial with the plug. Said bore is made at an angle with respect to the axis of the plug, and the upper end of the bore is located quite near the edge of the wedge plug. A longitudinal semi-circular or half groove *h*, in the periphery of the wedge plug registers with the half-groove *e* of the socket. The half groove *h* is provided with a biting face, so as to prevent the end of the cable from slipping when the strain is first imposed. The upper end of the bore *g* and groove *h* are connected by an annular groove *j*, which forms a support for the bight *k* of the cable *m*.

The general manner of use of this device is as follows:

The wedge plug *f* is removed upwardly from its seat in the socket by tapping it on its smaller end. The flattened portions of the plug and socket will keep the former from turning, and thus maintain the grooves *e* and *h* in proper relative position. The end of the cable *m* is then thrust up through the bore *g*, and a large bight formed on the end thereof, the extreme end of the cable being brought downward to the position shown in Fig. 2. A pull on the working end of the cable will seat the wedge plug *f* in the socket and draw the bight *k* into the groove *j*. The pull on the working end of the cable *m* will tend to exert a central downward thrust on the wedge plug, forcing the latter to more firmly clamp the end of the cable and thus hold it secure. The helical corrugations or biting face *i* of the groove *h* are rounded so as not to cut or otherwise injure the cable, and the valleys of these corrugations form seats for the twisted strands of the cable, so as to provided for a maximum area of contact, and at the same time further secure the cable against slipping. The cable may be removed from the clamp at any time by unseating the plug *f*.

I claim:

1. In a cable clamp, the combination of a tapering socket made with a longitudinal half-groove, a wedge made with a peripheral longitudinal conforming half-groove, and the inner end of the latter and of the bore being connected by an annular groove, one of said registering half-grooves being provided with a biting surface.

2. In a cable clamp, the combination of a tapering socket made with a longitudinal half-groove, and a wedge made with a longitudinal bore and a peripheral longitudinal conforming half-groove.

3. In a cable clamp, the combination of a tapering socket made with a longitudinal half-groove, a wedge made with a longitudinal bore and a peripheral longitudinal conforming half-groove, the inner end of the latter and of the bore being connected by an annular groove, one of said registering half-grooves being provided with a biting surface, and the related sides of the socket and wedge being made with engaging faces adapted to bring the half grooves of the socket into registration.

<div style="text-align:right">WILLIAM W. POPE.</div>

Copies of this patent may be obtained for five cents each, by addressing the "Commissioner of Patents, Washington, D. C."